United States Patent
Vandenberghe et al.

(10) Patent No.: US 9,797,424 B2
(45) Date of Patent: Oct. 24, 2017

(54) LOCAL CONNECTION OF SHEETS ONTO ONE ANOTHER, METHOD AND APPARATUS FOR THE IMPLEMENTATION THEREOF

(75) Inventors: Jef Vandenberghe, Marke (BE);
Diederick Syoen, Vlamertinge (BE);
Simon Dewulf, Koksijde (BE)

(73) Assignee: CREAX PROJECTS N.V., Kortrijk (BE)

( * ) Notice: Subject to any disclaimer, the term of this patent is extended or adjusted under 35 U.S.C. 154(b) by 828 days.

(21) Appl. No.: 14/124,811

(22) PCT Filed: Jun. 8, 2012

(86) PCT No.: PCT/EP2012/060843
§ 371 (c)(1),
(2), (4) Date: Dec. 9, 2013

(87) PCT Pub. No.: WO2012/168394
PCT Pub. Date: Dec. 13, 2012

(65) Prior Publication Data
US 2014/0099158 A1    Apr. 10, 2014

(30) Foreign Application Priority Data
Jun. 9, 2011    (BE) .................................. 2011/0353

(51) Int. Cl.
*F16B 5/00*    (2006.01)
*B31F 5/02*    (2006.01)
(Continued)

(52) U.S. Cl.
CPC .............. *F16B 5/0096* (2013.01); *B31D 1/00* (2013.01); *B31F 5/027* (2013.01); *B65B 7/24* (2013.01);
(Continued)

(58) Field of Classification Search
CPC .......... F16B 5/0096; B31D 1/00; B31F 5/027; B65B 7/24; B65D 5/4279; Y10T 403/4941; B31B 2201/6052
(Continued)

(56) References Cited

U.S. PATENT DOCUMENTS 2,120,470 A * 6/1938 Patterson ............. B65D 5/4279
206/140
2,257,151 A * 9/1941 Berke .................... A45C 11/02
206/8
(Continued)

FOREIGN PATENT DOCUMENTS

DE    3508657 A1    9/1986
EP    0169499 A1    1/1986

OTHER PUBLICATIONS

International Search Report for corresponding PCT Application No. PCT/EP2012/060843, dated Sep. 19, 2012.
(Continued)

*Primary Examiner* — James Ference
(74) *Attorney, Agent, or Firm* — Workman Nydegger (57) ABSTRACT

A local connection of contact surfaces of top and bottom sheets is formed in a defined connection zone. The zone is polygonal and the top and bottom sheets jointly form within the periphery of this zone a connecting lip with their first side faces located opposite one another cut obliquely through their sheet thickness. These first side faces of the sheets and their adjacent obliquely-oriented second side faces in the zone are complementarily beveled in the form of a conical wall running downwards and inwards, so that in the vicinity of these second neighboring side faces the underside of the bottom sheet protrudes inwards past the top surface of the connecting lip at the location of the top outside
(Continued)

edges of its first side faces. A method and an apparatus are arranged to implement the local connection.

8 Claims, 8 Drawing Sheets

(51) Int. Cl.
  *B65B 7/24* (2006.01)
  *B65D 5/42* (2006.01)
  *B31D 1/00* (2017.01)

(52) U.S. Cl.
  CPC .... *B65D 5/4279* (2013.01); *B31B 2201/6052* (2013.01); *Y10T 403/4941* (2015.01)

(58) Field of Classification Search
  USPC .......................................... 493/343; 403/279
  See application file for complete search history.

(56) References Cited

U.S. PATENT DOCUMENTS

| | | | | |
|---|---|---|---|---|
| 2,660,364 A * | 11/1953 | Ferguson | ............ | B65D 5/2047 229/108 |
| 2,916,181 A * | 12/1959 | Pfister | ............ | B21D 51/52 220/62 |
| 2,975,892 A * | 3/1961 | Leavitt | ............ | B65D 71/70 206/392 |
| 3,246,829 A * | 4/1966 | Stuart | ............ | B65D 5/247 229/122 |
| 3,272,421 A * | 9/1966 | Perry | ............ | B65D 5/10 229/117 |
| 3,335,935 A * | 8/1967 | McCallum | ............ | B65D 5/247 229/152 |
| 3,623,650 A * | 11/1971 | Watts | ............ | B65D 5/0015 206/509 |
| 3,637,130 A * | 1/1972 | Farquhar | ............ | B65D 5/0209 206/562 |
| 3,682,369 A * | 8/1972 | Isakson | ............ | B65D 5/302 229/195 |
| 4,009,805 A * | 3/1977 | Klygis | ............ | B65D 25/42 206/820 |
| 4,139,146 A * | 2/1979 | Bamburg | ............ | B65D 5/307 229/119 |
| 4,577,799 A * | 3/1986 | Oliff | ............ | B65D 5/10 206/155 |
| 4,738,286 A * | 4/1988 | McIntyre | ............ | B65B 67/1205 141/10 |
| 4,917,291 A * | 4/1990 | Saiki | ............ | B65D 5/2061 229/103.3 |
| 5,000,313 A * | 3/1991 | Oliff | ............ | B65D 71/16 206/140 |
| 5,016,814 A * | 5/1991 | Fullerton | ............ | B65D 5/308 229/195 |
| 5,131,588 A * | 7/1992 | Oliff | ............ | B65D 71/16 206/427 |
| 5,145,062 A * | 9/1992 | Crispi | ............ | A47K 10/185 206/233 |
| 5,346,455 A * | 9/1994 | Volkert | ............ | B41F 17/02 156/227 |
| 5,472,090 A * | 12/1995 | Sutherland | ............ | B65D 71/16 206/140 |
| 5,518,168 A * | 5/1996 | Mayer | ............ | B65D 5/0209 206/807 |
| 5,772,030 A * | 6/1998 | Baxter | ............ | B65D 71/36 206/427 |
| 5,913,474 A * | 6/1999 | Chu | ............ | B65D 5/0035 229/167 |
| 5,941,389 A * | 8/1999 | Gomes | ............ | B65D 71/20 206/427 |
| 6,186,931 B1 * | 2/2001 | Calvert | ............ | B31B 1/50 493/136 |
| 6,528,176 B1 * | 3/2003 | Asai | ............ | B21D 39/021 29/521 |
| 6,926,195 B1 * | 8/2005 | Rhyne | ............ | B65D 5/4279 229/149 |
| 6,932,266 B2 * | 8/2005 | Jones | ............ | B65D 5/029 229/109 |
| 7,182,242 B2 * | 2/2007 | Cai | ............ | A47G 19/065 206/217 |
| 2003/0080180 A1 * | 5/2003 | Holley, Jr. | ............ | B65D 71/36 229/117.13 |
| 2004/0222278 A1 * | 11/2004 | Correll | ............ | B65D 5/2033 229/110 |
| 2005/0011939 A1 * | 1/2005 | Angelopoulos | ...... | B65D 5/2057 229/109 |
| 2005/0103832 A1 * | 5/2005 | Correll | ............ | B65D 5/2033 229/110 |
| 2005/0167476 A1 * | 8/2005 | Ikeda | ............ | B65D 71/36 229/117.13 |
| 2005/0167478 A1 * | 8/2005 | Holley, Jr. | ............ | B65D 71/36 229/117.13 |
| 2005/0279815 A1 * | 12/2005 | Fogle | ............ | B65D 71/34 229/103.2 |
| 2006/0157545 A1 * | 7/2006 | Auclair | ............ | B65D 71/20 229/103.2 |
| 2006/0281619 A1 * | 12/2006 | Hollis | ............ | B65D 1/265 493/155 |
| 2008/0179385 A1 * | 7/2008 | Nikolai | ............ | B65D 5/28 229/126 |
| 2010/0089988 A1 * | 4/2010 | Brand | ............ | B65D 71/16 229/185 |
| 2010/0133330 A1 * | 6/2010 | Spivey, Sr. | ............ | B65D 5/4266 229/117.13 |

OTHER PUBLICATIONS

Chinese Office Action from Chinese Application No. 201280038917.X, dated Jul. 16, 2015.

\* cited by examiner fig 1 fig 2 fig 13 fig 14

LOCAL CONNECTION OF SHEETS ONTO ONE ANOTHER, METHOD AND APPARATUS FOR THE IMPLEMENTATION THEREOF

TECHNICAL FIELD AND BACKGROUND OF THE INVENTION

The present invention relates to a local connection of sheets onto one another and a method and apparatus for the implementation thereof. In particular, the invention is applied to the connection of a top and a bottom sheet onto one another at their common contact surface and in at least one defined connection zone. Sheets here mean relatively thin pieces of material that are thus (somewhat elastically) pliable, but possess a certain rigidity, for example sheets (boards) based on cardboard, plastic or laminates.

Currently connecting such sheets to one another is generally done by gluing or stapling the sheets together in the connection zone, attaching them together with rivets, joining them with binding wire (for example by stitching), fusing, etc. These techniques are applied to the cover flaps of packaging boxes, for example. To this end, a foreign material is generally used that has a composition which is different from the raw material of the sheets themselves. When recycling the worn sheets or objects manufactured from them, such as receptacles, this foreign material often constitutes an ecological difficulty. Indeed, the foreign material can impermissibly contaminate the sheet with regard to its subsequent processing in recycling lines (by shredding or grinding) or for the reuse of the ground raw material.

It is known from EP 169499 that a cardboard packaging box can be closed by locally connecting together the cover flaps lying on one another, without the addition of foreign material. To this end, a suitable opening is first made in the bottom cover flap. This intervention necessarily produces pieces of waste from the bottom sheet. Then suitable pre-cut connecting lips are pressed in the top cover flap transversely through the opening below two tongues of the bottom cover flap that border this opening. With this construction, however, the opening still exists after the connecting operation. Furthermore, the prior separate cutting operations in the bottom and top sheet are done completely separately from the subsequent actual connecting operation with a separate pressing apparatus.

SUMMARY OF THE INVENTION

It is an object of embodiments of the invention to avoid the use of foreign material in the connection zones between two sheets of material. It is an advantage of embodiments of the present invention that extra material costs for the realization of the connection are avoided.

This objective is surprisingly achieved according to embodiments of a first aspect of the present invention by providing a local connection of the top and bottom sheets onto one another in their contact surface in at least one defined connection zone, whereby this zone is polygonal and whereby within the periphery of this zone the top and bottom sheets jointly form a connecting lip with their first side faces located opposite one another cut obliquely through their sheet thickness. These first side faces of the sheets and their adjacent obliquely-oriented second side faces in this zone are also complementarily bevelled in the form of a conical (funnel-shaped) wall running downwards and inwards, so that in the vicinity of these second neighbouring side faces the underside of the bottom sheet protrudes inwards past the top surface of the connecting lip at the location of the top outside edges of its first side faces.

Furthermore, it is an advantage of embodiments of the present invention that the local connections between two sheets of material are realised without waste sheet material being produced in the connection zones. After all, the removal of such waste can complicate the connecting process.

Embodiments of the present invention also enable dimensionally stable connections to be realised. This means that the contact surfaces of the connected sheets can barely move or not at all with respect to one another.

Furthermore, embodiments of the present invention provide connections that do not create or leave behind any undesired openings transversely through one or both sheets in the connection zones. This is especially useful to avoid dust particles in the atmosphere above the top sheet, for example, penetrating through these openings from the top to the underside of the connected sheets, or vice versa from the bottom to the top.

In addition, to obtain an important increase in productivity, all steps of a local connecting operation according to embodiments of the present invention may be done in one and the same compact apparatus. Thus, both the preparatory operations on the sheets lying on one another to generate the connection zone and those for the realisation of the actual connection in these zones may take place in the same direction.

In particular embodiments, the top surface of the polygonal connection zone may practically be an octagon, comprising the two opposite outside edges of the second oblique side faces and two opposite folding edges oriented transversely to them. In between there are four connecting edges that belong to surfaces cut perpendicular to the sheet surface. Other advantageous polygonal connection zones and their benefits are further described and claimed in the claims.

It is an advantage of embodiments of the present invention that they may smoothly connect the sheets to be connected together by an industrial machine in a number of places in series in order to guarantee a sufficiently robust total connection. Moreover, in embodiments of the present invention, the connection may be realised in a subsequently easily detachable way. Embodiments of the present invention also give rise to a reliable indication or effect of a seal of the connection or of an undesired breakage (tamperproof) of the connection or seal. Indeed, once broken the connection cannot normally be restored to its original state without leaving behind traces of an earlier breakage.

In practice the connection can comprise a series of successive connection zones that lie in line with one another along an axis. For example, this enables a type of detachable zipper connection to be realised, as explained hereinafter. This series can form a succession of equal connecting segments where each segment consists of two similar connection zones, for example.

In particular embodiments, the present invention comprises a very advantageous local connection of top or bottom sheets onto one another in their contact surface in at least two neighbouring defined connection zones: a primary one and a secondary one. These zones are then preferably rectangular. Within the periphery of each zone, the top and bottom sheets form a connecting lip with their first side face of the sheets obliquely cut through their sheet thickness near their complementary and adjacent obliquely cut second side face in each of the zones. This is constructed such that in the vicinity of this adjacent second side face, the underside of the bottom sheet protrudes past the top surface of the connecting lips at the location of the top outside edges of their first side face.

In a second aspect, the present invention provides a method to implement the above-mentioned local connection according to embodiments of the first aspect of the present invention. The method comprises a number of successive steps. First of all the sheets to be connected lying on one another are temporarily secured in their contact zone near the connection zone. The sheets are then cut through in an oblique direction with suitable cutting instruments locally in the connection zone near the said first and second side faces of them in order to define the connecting lip. After removing these cutting instruments the thus defined lip is pressed downwards until its top surface at least partially extends below the underside of the bottom sheet, after which the pressing operation and securing operation is stopped. This pressing operation can be done by a machine with suitable pressing punches.

According to a very advantageous aspect of this method, the securing operation comprises the making of suitable (pointed and/or linear) substantially perpendicular incisions through both sheets. Also in order to form the actual connecting lip, the transversely oriented ends of the said perpendicular incisions thereby border the first and second oblique side edges to be made afterwards.

Finally, in a third aspect, the present invention relates to a practical apparatus to implement embodiments of the method according to the second aspect. This apparatus comprises a framework to be placed over the sheets to be connected in which temporary securing means and also the first guiding means—e.g. in the form of suitable grooves or slots in the apparatus—are mounted in order to move obliquely-oriented cutting instruments that can be slid up and down over them towards the oblique side faces of the connection zone to be formed in order to form the connecting lip. In the framework, further second guiding means are mounted in order to move a pressing punch up and down in order to at least partially press through the connecting lip in the connection zone until its top surface near the said oblique first and second side faces extends under the underside of the bottom sheet. The apparatus also comprises the necessary driving means for the securing and guiding means, cutting instruments and pressing punch, as well as the control instruments for the drive and coordination of the securing operation, the movement of the cutting instruments and the pressing punch.

According to a particular embodiment of the apparatus, the securing means comprise blades to make cuts perpendicular to the sheet surfaces. These cuts form part of the periphery of the connection zone and thus the edges of the connecting lip.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

All this will now be explained on the basis of a few embodiments that are illustrated in the accompanying drawings. It goes without saying that the invention is not limited to these embodiments, but includes all kinds of obvious variants of them.

The drawings are only schematic and are non-limiting. In the drawings, the size of some of the elements may be exaggerated and not drawn on scale for illustrative purposes. The dimensions and the relative dimensions do not necessarily correspond to the actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present invention, the terms "bottom sheet" and "top sheet" are used. The top sheet is considered, irrespective of its actual position in space, that sheet against which a pressing action is applied, e.g. by means of a pressing punch, to push a lip through a space created through both the top sheet and the bottom sheet, so as to secure the lip behind a part of a surface of the bottom sheet. The pressing action may for example be upward (in which case the sheet called the top sheet is physically located below the bottom sheet), downward (in which case the sheet called the top sheet is physically located on top of the bottom sheet), or sideward (in which case the sheet called the top sheet is physically located aside the bottom sheet).

In the context of the present invention, the bottom surface of the top sheet is that surface of the top sheet which is oriented towards the bottom sheet. Similarly, the top surface of the bottom sheet is that surface of the bottom sheet which is oriented towards the top sheet.

In the context of the present invention, with "perpendicular cutting" is meant cutting in a direction substantially perpendicular, e.g. perpendicular, to the plane of a sheet. With "oblique cutting" is meant cutting in a direction which substantially deviates, e.g. deviates at least 10°, e.g. between 10° and 80°, for example at least 20°, such as about 45°, from a direction perpendicular to the plane of a sheet. It will be clear for a person skilled in the art that an optimal value for the angle under which oblique cutting is performed depends strongly on the type and/or thickness of material to be cut.

Figure 1:
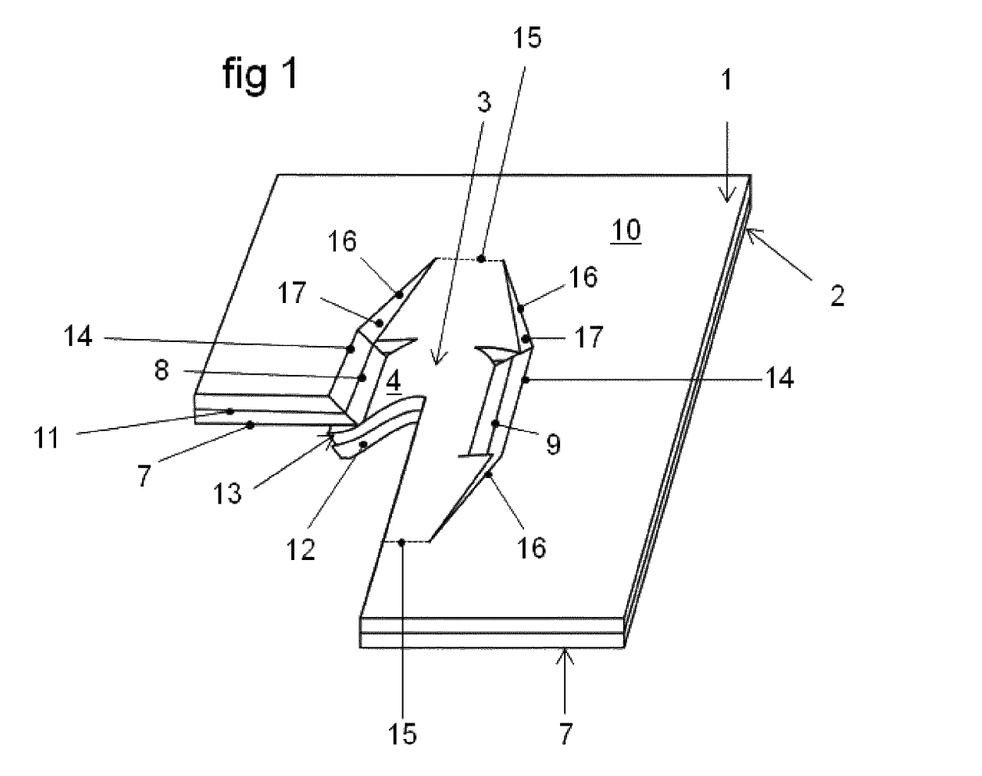
FIG. 1 shows a perspective sketch of an octagonal local connection of sheets according to a first embodiment of a first aspect of the invention and with a partial cutaway (bottom left of the drawing).

The locally formed connection of a top sheet 1 to a bottom sheet 2 according to the embodiment of the present invention illustrated in FIG. 1 shows an octagonal connecting lip 12 centrally in the connection zone 3. The periphery of zone 3 comprises two opposite folding edges 15. The ends of these folding edges are bordered by four intermediate connecting edges 16 that are cut through perpendicular to sheet surface 10, being the top surface of the top sheet 1, to form perpendicular cut surfaces 17. Near the other ends of these connecting edges 16, the second oblique cut surfaces 8 and 9, in the embodiment illustrated opposite one another, connect to each of their top outside edges 14. Near these oblique side faces 8 and 9 are neighbouring complementary first oblique side faces 5 and 6 of connecting lip 12.

Figure 2:
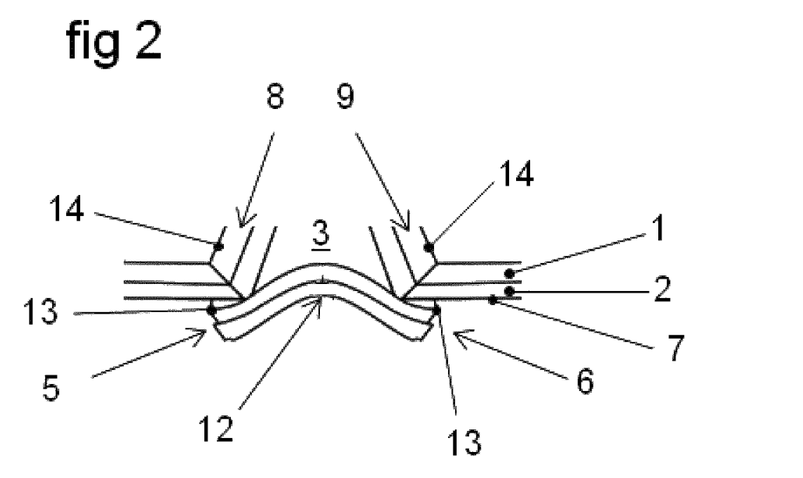
FIG. 2 shows a cross-section of the connection zone of FIG. 1.

In the connection formed it can be seen in FIGS. 1 and 2 that the bottom surface 7 of the bottom sheet 2 protrudes inwards, i.e. protrudes in the direction of the centre of the connection zone 3, past the top surface 4 of connecting lip 12 at the location of the top outside edges 13 of its first side faces 5 and 6. The second side faces 8 and 9 form as it were the walls of a funnel-shaped space. When connecting, the connecting lip 12 deforms from a flat position to a rather complex curved position. Its top surface 4 partially descends below the level of the top surface 10 of the top sheet from the folding edges 15, also at the level of perpendicular cuts 17 near the four connecting edges 16. As a result of this configuration, connecting lip 12 adequately blocks any movement of sheets 1 and 2 over one another in and around connection zone 3. No foreign materials such as e.g. glue or staples are used for the connection, no waste is produced and no undesired openings are created. Furthermore, in the entire connection zone 3, the two sheets completely overlap one another. Their congruent curved position thus contributes to an extra blocking effect.

Figure 3:
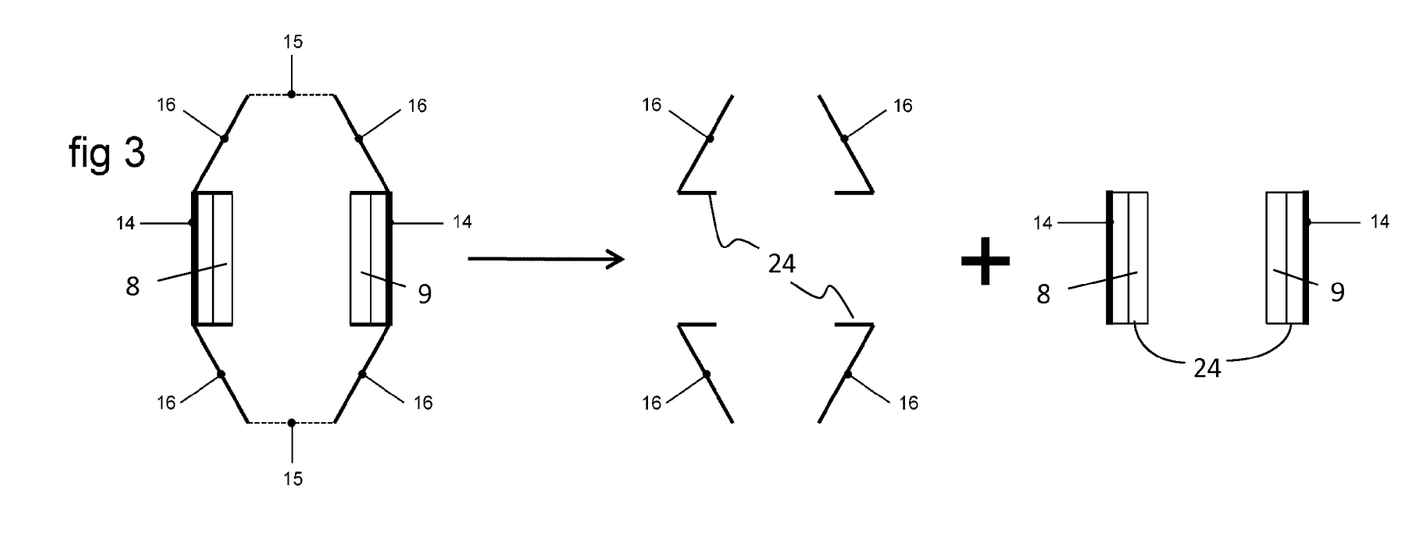
FIG. 3 schematically illustrates the structure of oblique and perpendicular cuts to form an octagonal connection zone in accordance with embodiments of the present invention.
Figure 4:
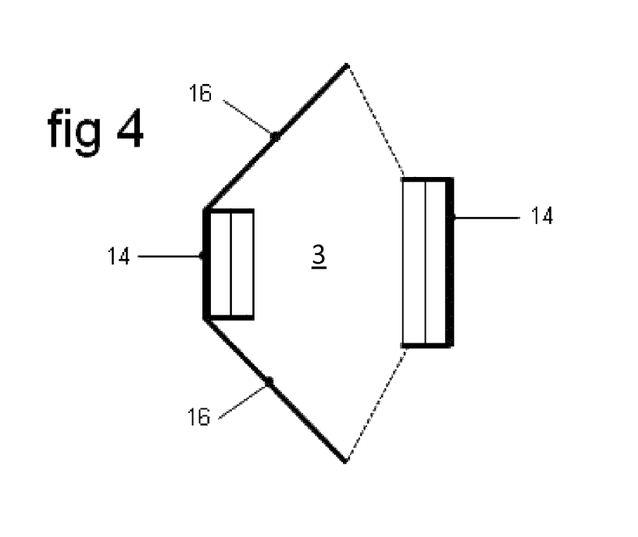
FIG. 4 schematically shows a hexagonal connection zone according to embodiments of the present invention.

FIG. 3 schematically shows the octagonal connection zone 3 of FIG. 1. It is subdivided into the perpendicularly cut connecting edges 16 and the obliquely cut second side faces 8,9. The dotted lines in FIG. 3 are folding edges. This schematic model has been included for the purpose of comparison for the discussion of other embodiments in FIGS. 4 to 8. These drawings speak for themselves. Zone 3 is in fact bounded by the sum of the perpendicular cuts 16 and the second oblique side faces 8,9. It is to be noted here that, in particular embodiments, the transversely running ends 24 of perpendicular cuts 16 extend more deeply inwards on either side of connection zone 3 than the adjacent second oblique side faces 8 and 9. This may be useful to be able to press through the oblique side faces 5,6 below bottom surface 7 of the bottom sheet 2.

Figure 5:
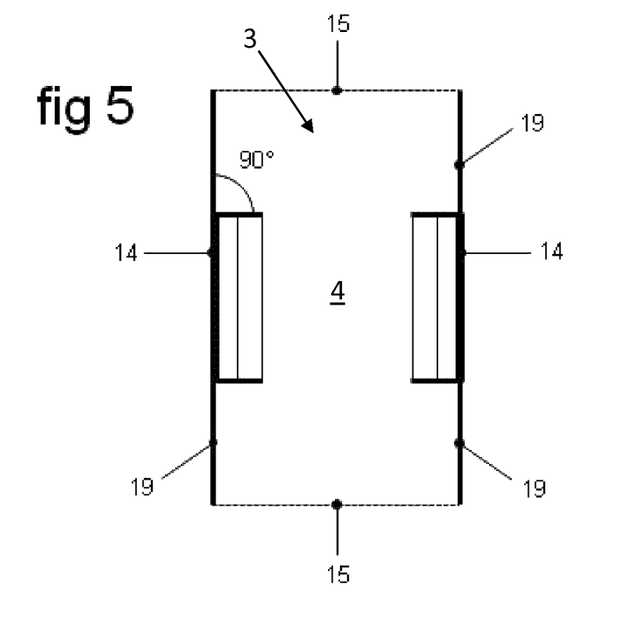
FIG. 5 shows a rectangular embodiment of a connection zone according to embodiments of the present invention.

In the connection according to FIG. 5, top surface 4 of connection zone 3 is a rectangle comprising the two opposite outside edges 13 of the first side faces 5,6, and practically perpendicular to this the two opposite folding edges 15. In between there are four connecting edges 16 that belong to surfaces 17 cut perpendicular to the top sheet surface 10, and whereby the connecting edges 16 comprise parts that run in the line of the outside edges 13 of the oblique incisions.

Figure 6:
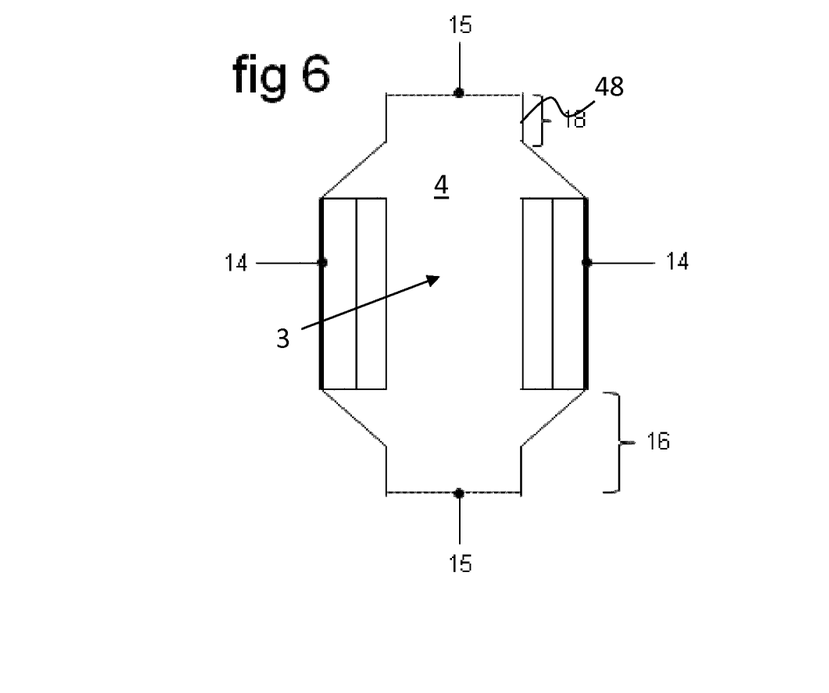
FIG. 6 shows another polygonal variant embodiment according to embodiments of the present invention.

In the connection according to FIG. 6 in the top surface 4 of the connection zone 3 there is another polygon with two opposite outside edges 13 of the first side faces 5,6 and practically perpendicular to this two opposite folding edges 15. In between there are four connecting edges 16 that belong to surfaces 17 cut perpendicular to the top sheet surface 10. The connecting edges 16 comprise parts 18 that run parallel to the said outside edges 13, and parts 48 that run under an angle to the said outside edges 13.

Figure 7:
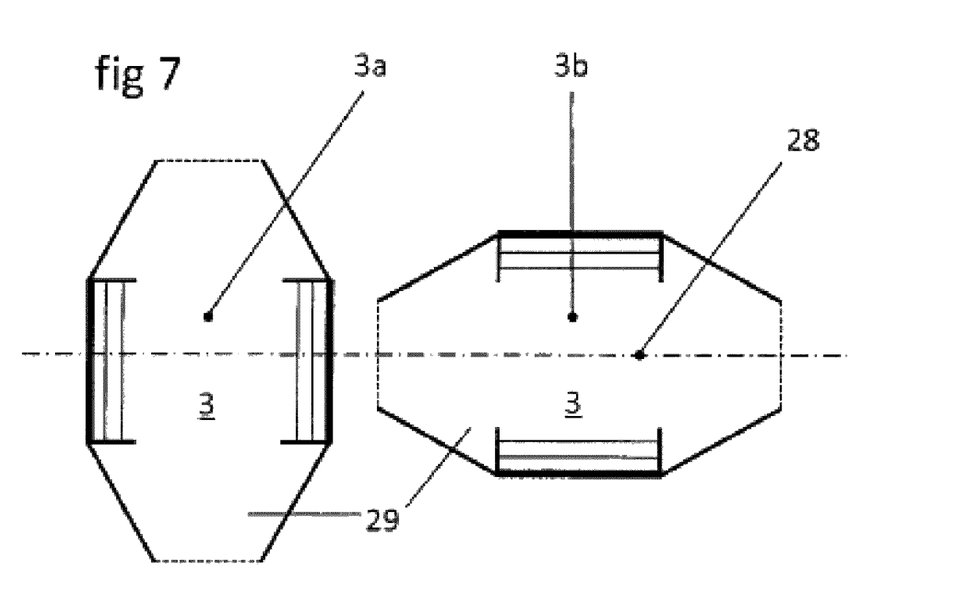
FIG. 7 shows a connection that comprises at least two successive connection zones in line with one another, according to embodiments of the present invention.

The connection according to FIG. 7 shows two zones 3a and 3b of a series 29 of successive octagonal connection zones 3 that are in line with one another along a common axis 28. The successive zones 3 in the series can have different shapes. Alternatively, the successive zones 3 in the series can have a same shape. The successive zones in series 29 can be oriented in the same way, e.g. with their longitudinal axis in a same direction, with respect to the common axis 28, or otherwise, for example orthogonal to one another, such as the zones 3a and 3b of FIG. 7. This enables a type of strip-shaped connecting structure to be realised along this axis as a local connection. This structure can for example be constructed such that it can be pulled open by hand as a type of zipper connection. Series 29 can comprise a repetitive pattern of successive connection zones 3a, 3b. Multiple connection zones 3 can also be applied spread evenly or otherwise over the connected sheet surfaces. An even distribution in the form of a matrix of connection zones 3 over the surface of the sheets to be connected can be advantageous.

Figure 8:
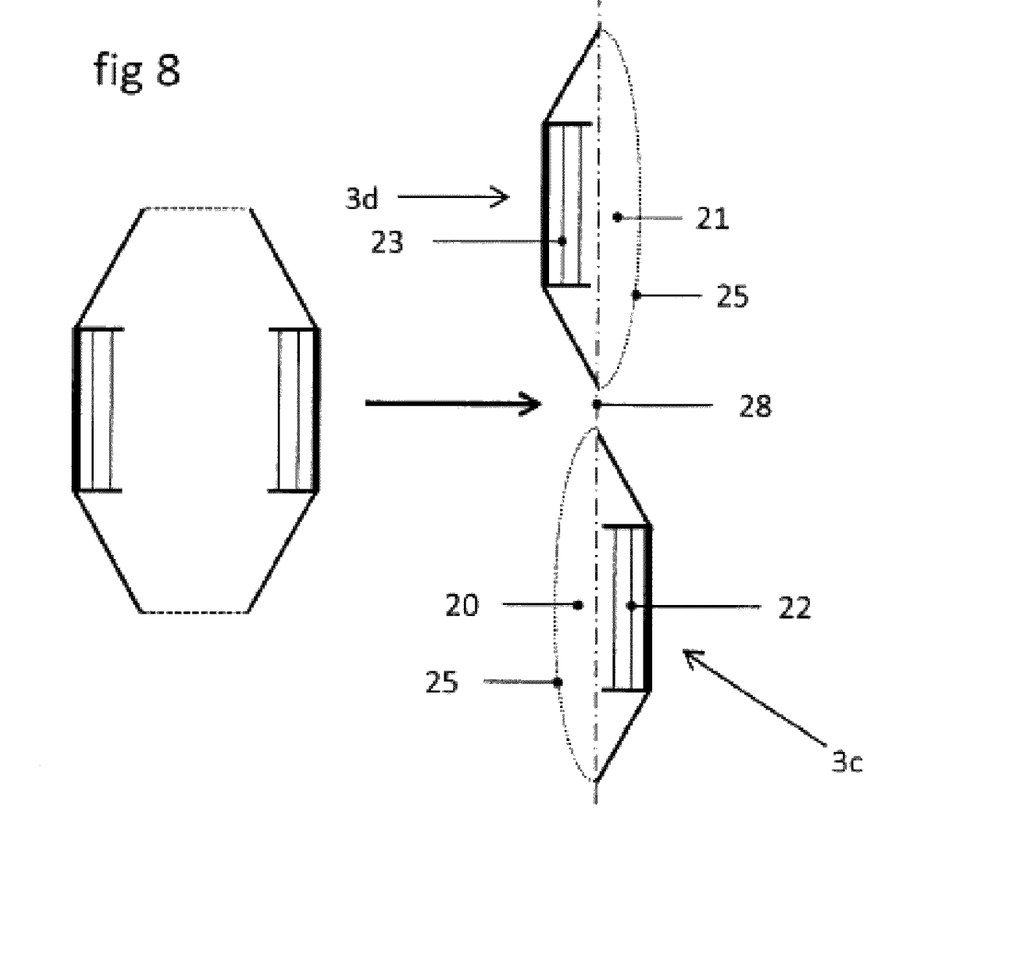
FIG. 8 shows a local connection in at least two neighbouring rectangular connection zones, according to embodiments of the present invention.

The schematic model of FIG. 8 illustrates a local connection of top and bottom sheets 1 and 2, respectively, onto one another in their contact surface that is a type of division of the octagonal connection of FIG. 3 in two separate neighbouring rectangular connection zones 3c and 3d along an axis 28. The periphery of each zone 3c and 3d, respectively, forms a connecting lip 20 and 21, respectively. They each comprise their first side face 22 and 23, respectively, of the sheets 1,2 cut obliquely through the double sheet thickness near their complementary and adjacent obliquely cut second side faces so that the bottom surface 7 of the bottom sheet 2 protrudes past the top surface 4 of the connecting lips 20,21 in the vicinity of this adjacent second side face. In this configuration the folding edge 25 is generally somewhat curved with respect to the oblique side faces 22,23.

The construction and operation of an apparatus 30 according to a second aspect of the invention will now be explained on the basis of an embodiment shown in successive operating positions in FIGS. 9 to 12. The apparatus comprises a framework 31 that can be suitably moved up and down (arrows 42 and 43) over the sheets 1 and 2 to be connected onto one another, near the connection zones 3 to be made therein. In this framework, a first guiding system, e.g. comprising four suitable oblique guiding means such as guiding grooves 33 (as a component of the first guiding system) are affixed symmetrically with respect to a central axis 32 for the correct back and forth motion of the obliquely oriented cutting instruments 36 with the aid of a hingeable bar linkage 34, 35.

This bar linkage can in turn be moved up and down (arrows 44 in FIG. 11) coupled to a pressing punch 39 via suitable upright guiding means such as guiding grooves 38 as (a component of) a second guiding system. This pressing punch is used to suitably press through the first side faces 5,6 of connecting lip 12 to form the sheet connection. This punch 39 can thus move up and down between a top position in FIG. 10 and a bottom position in FIG. 11. The bars 34 also comprise a further guiding system, e.g. comprising a groove 37 in which a coupling pin 40 grips with bearing block 41, for cutting instruments 36.

It will often be recommended to temporarily secure the sheets 1,2 in the connection zone 3 during the realisation of the local connection. Indeed, the sheets may only barely move, or even not move at all, with respect to one another, nor may they detach from one another in their contact surface 11 during this operation or afterwards. To this end a suitable set of vertically placed blades 45 may be mounted in the underside of framework 31. When the apparatus descends at the start of the connecting operation (FIG. 9) these blades 45 cut vertically through sheets 1, 2 to form a part of the outline (perpendicular connecting edges) 16-19 of connection zone 3. These blades 45 thus guarantee sound securing of the sheets 1, 2 in their position during the connecting operation. It is an advantage of embodiments of the invention that this securing operation can be done in the same apparatus 30 together with the actual connecting operation and without additional time being required for a separate securing step. When raising apparatus 30 back up (FIG. 12) the said blades 45 are automatically removed from zone 3.

Figure 9:
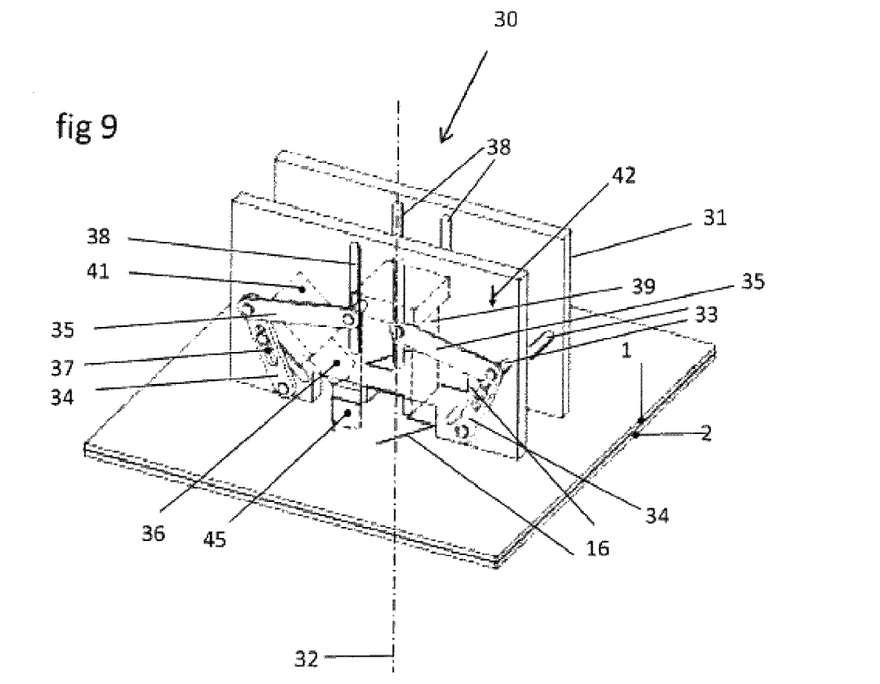
FIG. 9 shows a perspective sketch of an apparatus according to an embodiment of the second aspect of the present invention to form a local connection, the apparatus being in its starting position of the connecting process.

The connecting operation proceeds as follows. The two sheets 1, 2 to be connected—e.g. in the form of a pair of overlapping cover flaps of a filled cardboard box—are brought, e.g. over a conveyor belt, with the box under apparatus 30. Apparatus 30 is lowered over the connection zone 3 to be made until the underside of the framework 31 makes contact with top surface 4 of the connecting lips 12 (arrow 42) to be formed in the cover flaps (FIG. 9). At the same time, the sets of vertically placed blades 45 cut through the pairs of cover flaps 1, 2 to secure them in position and to form the perpendicular peripheries or connecting edges 16 of the connecting lip 12 to be formed. Framework 31 with blades 45 stays in this position until the connecting operation has been completed.

Figure 10:
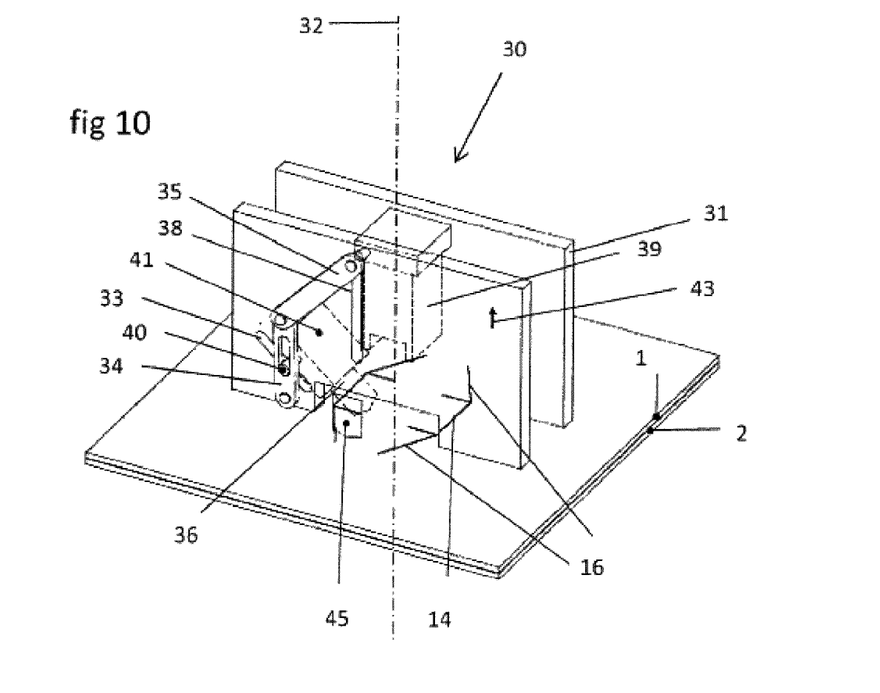
FIG. 10 shows the position of the apparatus of FIG. 9 when applying obliquely-oriented cutting instruments to form the oblique side faces along the periphery of the connection zone, in accordance with embodiments of the present invention.

Now the first and second oblique side faces 5, 6 and 8, 9 are made as sketched in FIG. 10. A driven and suitably controlled operating mechanism (not shown) lifts the pressing punch 39 in the framework (arrow 43) and at the same time actuates the first guiding system, e.g. moves the four hinged bar linkages 34, 35 so that the coupling pins 40 move downwards in their groove 37. This actuation, e.g. movement, now brings about the oblique displacement downwards of the bearing 41 of the obliquely oriented cutting instruments 36. These instruments 36 thus make a correct oblique cut through the (in the meantime secured) sheets 1, 2 to form the oblique side faces 5, 6 and 8, 9 of connecting lip 12.

Figure 11:
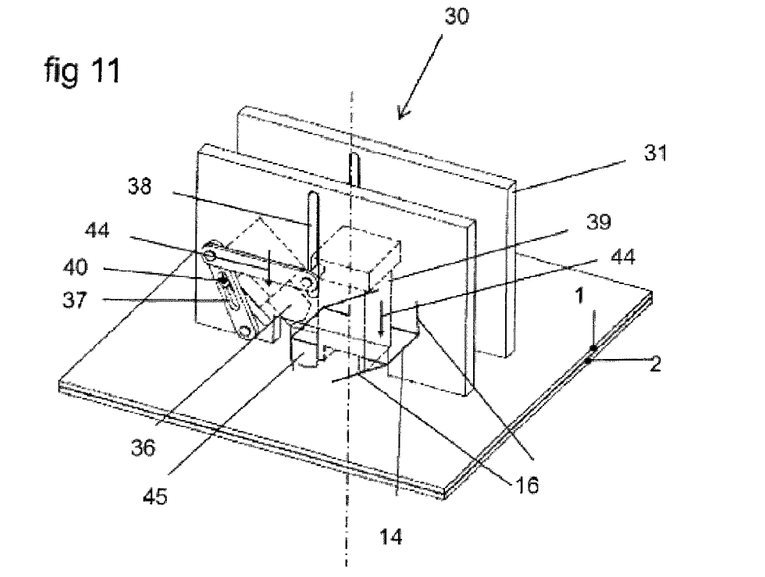
FIG. 11 illustrates the withdrawal of the cutting instruments of FIG. 10, and the simultaneous pressing through of the connecting lip with a pressing punch to form the connection zone, in accordance with embodiments of the present invention.

In the next step, illustrated in FIG. 11, the cut connecting lip 12 is now suitably pressed through near its first oblique side faces 5, 6 using pressing punch 39. This punch is thus pressed downwards (arrow 44) along the second guiding system, e.g. upright guiding grooves 38 with the same or another controlled operating mechanism with which it was lifted in FIG. 10. The control of this operating mechanism should in particular ensure appropriate coordination of the securing operation, the movement of the cutting instruments and the punch. At the same time, however, the obliquely oriented cutting instruments 36 are suitably pulled out (raised) from their cutting position by a suitably coupled operation of the second guiding system, e.g. the bar linkages 34, 35 via pin 40 in its groove 37. After all, cutting instruments 36 must not hinder the descent of pressing punch 39 in connection zone 3. The outermost punch edges must be able to extend, in their deepest position, to below the level of the bottom surface 7 of the bottom sheet 2.

Figure 12:
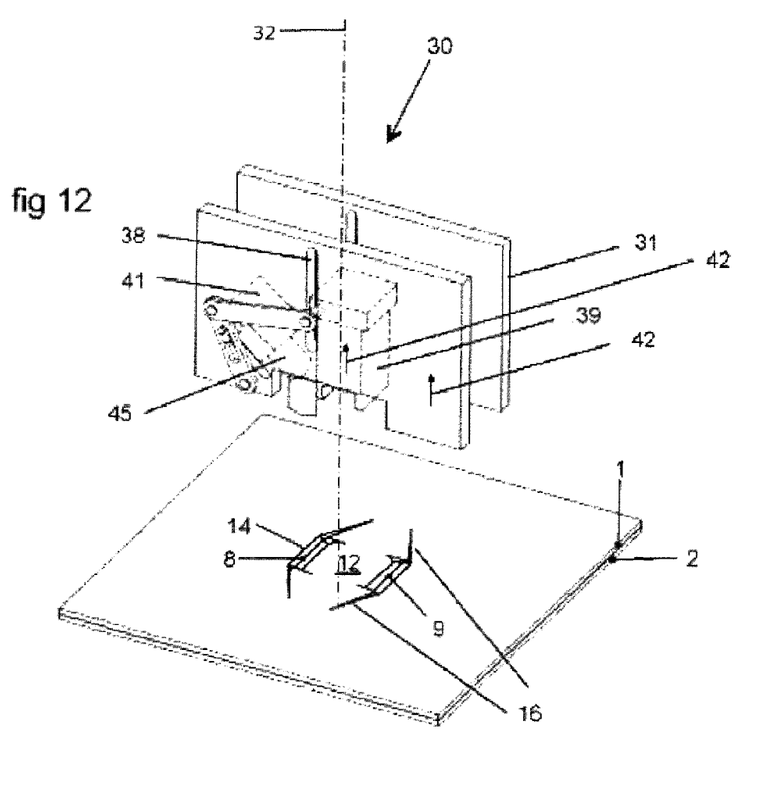
FIG. 12 shows the end position of the connecting cycle with the raised position of the apparatus and the local connection of the sheets onto one another realised.

FIG. 12 shows the end position of the connecting cycle whereby framework 31 and punch 39 are lifted up again after the realisation of the connection (arrows 42). The sheets 1, 2 (e.g. cover flaps of boxes) locally connected together, with the visible second oblique side faces 8, 9 of the connecting lip 12 on top, are ready and can be further transported (with the box) after which the cycle can resume.

It goes without saying that for a person skilled in the art, many obvious variants of this example can be applied.

EXAMPLE

Figure 13:
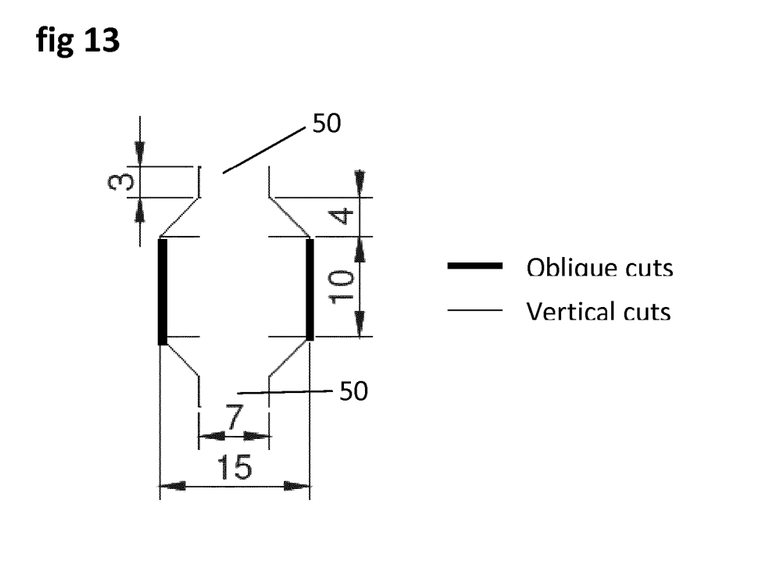
FIG. 13 shows a particular example of cuts and their dimensions, for the particular case of plane cardboard with a thickness of 0.8 mm.

FIG. 13 shows a particular example of cuts and their dimensions, for the particular case of plane cardboard with a thickness of 0.8 mm. The shape of the connecting lip is hexagonal with two collars 50. The hexagonal part comprises a rectangle with a length of 10 mm, and a width of 15 mm, and a trapezoid at either side in the length direction of the rectangle, the trapezoids having a base equal to the width of the rectangle, i.e. 15 mm in the example illustrated, and a height of 4 mm. The small side of the trapezoids, equal to the width of the collars, is 7 mm. The collars have a height of 3 mm.

Figure 14:
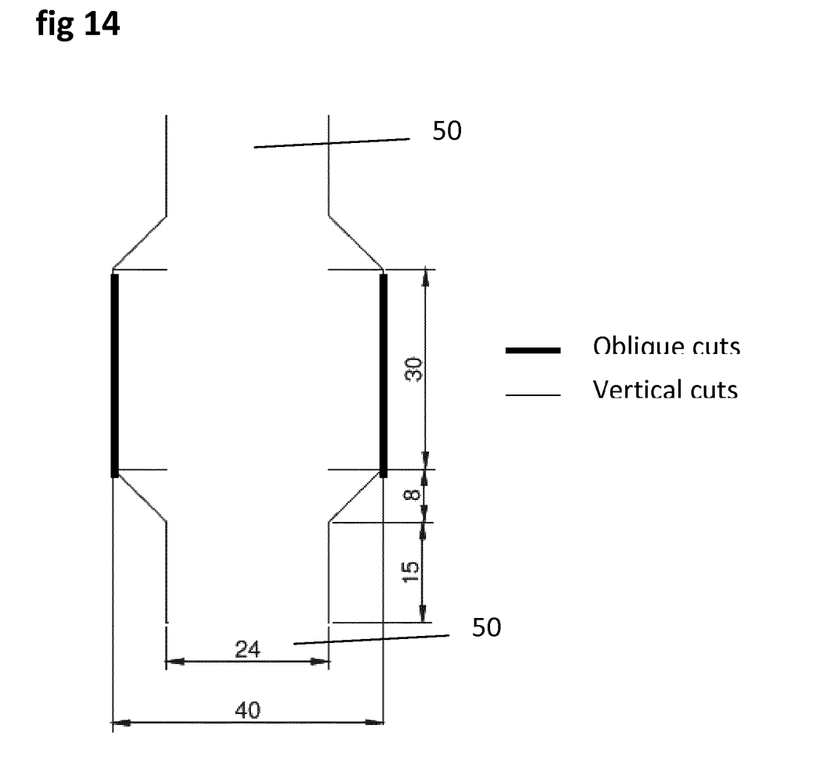
FIG. 14 shows a particular example of cuts and their dimensions, for the particular case of corrugated cardboard with a thickness of 3.0 mm.

FIG. 14 shows a particular example of cuts and their dimensions, for the particular case of corrugated cardboard with a thickness of 3.0 mm. The shape of the connecting lip is hexagonal with two collars 50. The hexagonal part comprises a rectangle with a length of 30 mm, and a width of 40 mm, and a trapezoid at either side in the length direction of the rectangle, the trapezoids having a base equal to the width of the rectangle, i.e. 40 mm in the example illustrated, and a height of 8 mm. The small side of the trapezoids, equal to the width of the collars, is 24 mm. The collars have a height of 15 mm.

The invention claimed is:

1. A local connection of a top sheet and a bottom sheet onto one another at a contact surface of each of the top sheet and the bottom sheet in at least one defined connection zone,
wherein the connection zone is polygonal, and wherein within a periphery of the connection zone the top and bottom sheets jointly form a connecting lip,
first side faces of the top and bottom sheets located opposite one another are cut obliquely through a sheet thickness of the top and bottom sheets, the first side faces of the top and bottom sheets being cut obliquely with respect to a thickness direction of the top and bottom sheets,
the first side faces of the top and bottom sheets and adjacent obliquely-oriented second side faces of the top and bottom sheets in the connection zone are complementarily bevelled to extend downward and inward such that an underside of the bottom sheet protrudes inwards past a top surface of the connecting lip at a location of corresponding top outside edges of each of the first side faces.

2. The local connection according to claim 1, wherein a top surface of the polygonal connection zone is substantially an octagon in shape, comprising the two opposite outside edges of the first side faces and transverse to the two opposite folding edges and in between four connecting edges belonging to surfaces cut perpendicular to the sheet surface.

3. The local connection according to claim 1, wherein a top surface of the connection zone is a rectangle, comprising the two opposite outside edges of the first side faces, and substantially perpendicular to the two opposite folding edges and in between four connecting edges belonging to surfaces cut perpendicular to the sheet surface and wherein the connecting edges comprise parts running in line with the outside edges.

4. The local connection according to claim 1, wherein a top surface of the connection is a polygon, comprising the two opposite outside edges of the first side faces and substantially perpendicular to the two opposite folding edges and in between a number of connecting edges belonging to surfaces cut perpendicular to the sheet surface and wherein the connecting edges comprise parts running in line with the outside edges.

5. The local connection according to claim 1, wherein the connection zone comprises a plurality of local connections distributed evenly over the surfaces of the sheets.

6. The local connection according to claim 5, wherein the plurality of connections zones are successively aligned with one another along a common axis.

7. The local connection according to claim 6, wherein the plurality of connections zones form a succession of equal connecting segments, wherein each of the connecting segment consists of two such connection zones.

8. The local connection according to claim 1,
wherein the connection zone comprises a plurality of neighboring local connection zones,
wherein the neighbouring connection zones are polygonal, and
wherein within the periphery of each the connection zones the top and bottom sheets form a connecting lip with their first side face cut obliquely through the sheet thickness of the sheets near their complementary and adjacent obliquely-oriented second side face in each of the connection zones, so that the bottom surface of the bottom sheet protrudes past the top surface of the connecting lips at the location of the corresponding top outside edges of the first side face.

* * * * *